3,328,268
CONTINUOUS RECOVERY OF ACRYLONITRILE
AND ACETONITRILE FROM MIXTURES BY PLU-
RAL EXTRACTIVE DISTILLATION WITH WATER
Marcel Borrel, Oullins, France, assignor to Societe
d'Electro-Chimie, d'Electro-Metallurgie et des Acieries
Electriques d'Ugine, Paris, France, a corporation of
France
Filed July 19, 1963, Ser. No. 296,284
Claims priority, application Great Britain, July 21, 1962,
28,135/62
8 Claims. (Cl. 203—84)

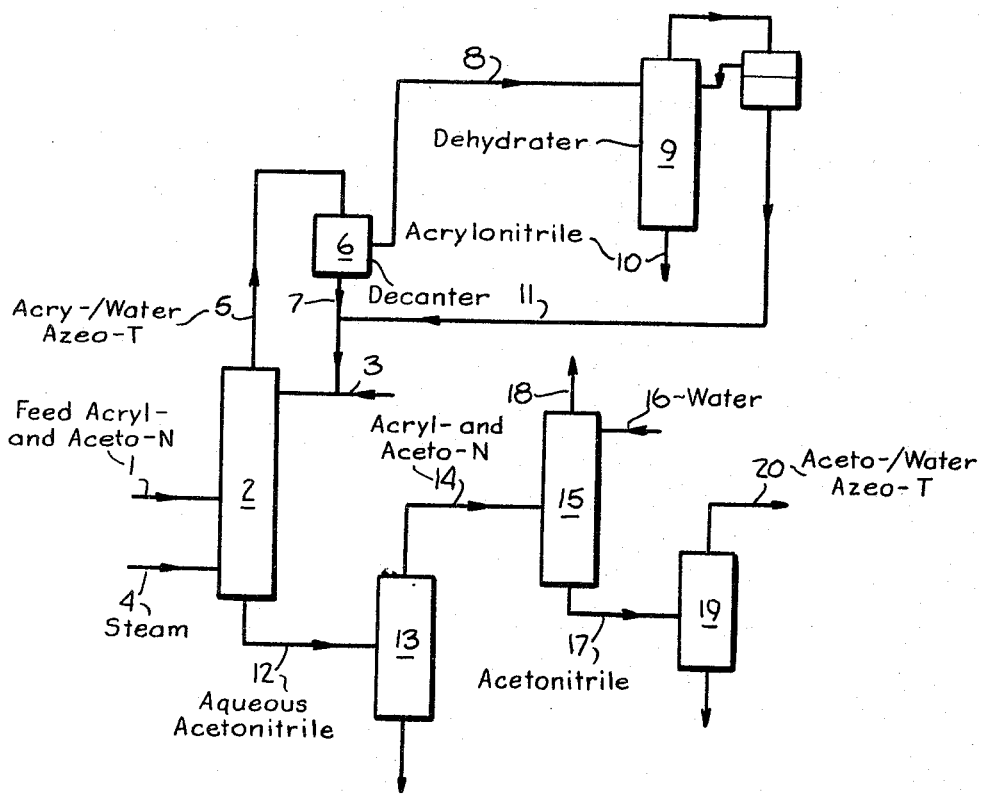

The present invention relates to the separation of mixtures containing acrylonitrile and acetonitrile and in particular to effecting such a separation by an extractive distillation technique.

Processes for the oxidation of propylene in the presence of oxygen and ammonia or of the pyrolysis of lacto nitrile or for the reaction of acetylene and hydrogen cyanide and resulting in the production of acrylonitrile together with small amounts of acetonitrile are known. When this acrylonitrile containing acetonitrile is subjected to polymerization the non-polymerized residue resulting from the reaction contains a relatively greater quantity of acetonitrile, which must be extracted from the residue before the latter can be recycled to polymerization since otherwise the product introduced into the polymerization cycle would become progressively enriched with acetonitrile to the eventual detriment of the polymerization operation.

The technique of separating by extractive distillation using water as an extractant two substances which cannot be separated by ordinary distillation but which do not form a ternary azeotrope with the water and which can be dissolved to produce a homogeneous phase throughout the column is well known.

Application of this known technique to a mixture of acrylonitrile and acetonitrile, such as is produced by the reaction of propylene, oxygen and ammonia at elevated temperatures over solid catalysts has shown that while it is relatively simple to obtain substantially pure acrylonitrile the simultaneous production of substantially pure acetonitrile is difficult and impracticable.

It has now been found that the substantially complete separation of acrylonitrile and acetonitrile can be conveniently effected by carrying out an extractive distillation with water in two stages.

Accordingly the present invention is a process for the separation of acrylonitrile and acetonitrile from their admixture containing less than 20% w./w. (weight by weight) of acetonitrile which comprises subjecting the mixture to a first extractive distillation, employing water as the extractant to obtain substantially pure acrylonitrile as an overhead fraction and an aqueous solution containing acetonitrile as base product distilling the base product to obtain an overhead fraction containing substantially all the acetonitrile and subjecting this overhead fraction to a second extractive distillation with water to obtain an aqueous solution of acetonitrile substantially free from acrylonitrile as a base product.

In operation the extractive distillations may be carried out by passing the distillation feed which contains less than 20% w./w. of acetonitrile to a suitable point of the column, suitably a 30 plate column, and feeding water to the top of the column such that water and rising vapors pass in countercurrent. The conditions operating in the first extractive distillation column are preferably selected to give a base product containing a weight ratio of acrylonitrile to acetonitrile of between 4:1 and 1:4 and preferably about 1:1.

The base product from the first extractive distillation may suitably be distilled in any known manner to produce a distillate containing acrylonitrile and acetonitrile, and residual water as a base product. The residual water may be recycled as part of the water feed to the first or second extractive distillations.

Acrylonitrile essentially stripped of acetonitrile taken from the head of the first extractive distillation column may be dried in accordance with known techniques, e.g. by azeotropic dehydration; the aqueous phase resulting from this drying step may be returned to the first extractive distillation.

The second extractive distillation is carried out in a similar manner to the first to yield a substantially pure aqueous solution of acetonitrile as base product. The overhead product from the second extractive distillation which comprises acrylonitrile containing some acetonitrile may be recycled as part of the feed to the first extractive distillation. In addition the solution of acetonitrile may be dehydrated in any suitable manner and the residual water recycled to either of the extractive distillations.

In accordance with the present invention it has also been found that a relationship exists between the number of absorption plates in the extractive distillation columns and the proportions of water required. By "absorption plates" is meant the plates between the point of introduction of feed and the point of introduction of the water. The plates situated below the point of introduction of the feed to be treated are described herein by the term "exhaustion plates." The number of exhaustion plates is dependent on the degree of separation to be accomplished. The number of absorption plates is very much dependent on the degree of purity desired for the separated product. The number determines the weight ratio between the solvent and the mixture to be treated.

The number of absorption plates in the distillation column is therefore linked with the degree of purity of the separated product and to the quantity of water employed, and a connection between this quantity of water employed and the number of absorption plates has been determined. For example it has been found that with a column having 11 absorption plates, 7.3 kilograms of water per kilogram of nitriles to be separated is preferably employed while the same degree of separation can be achieved with only 2.8 kilograms of water per kilogram of nitriles to be separated if a column with 42 absorption plates is used.

Thus far, the invention has been described with reference to mixtures of acrylonitrile and acetonitrile. It is known that these mixtures contain in addition other secondary organic components which have boiling points either below or above those of acrylontrile and acetonitrile, e.g. methanol, allyl alcohol and such higher nitriles as propionitrile and butene nitriles. Hitherto it has been possible to remove some but not all of these other impurities from the final acrylonitrile product. The application of the process of the present invention to such mixtures however allows one to obtain from the head of the first extractive distillation column acrylonitrile free not only from acetonitrile but also from the other impurities which accompany it whether their boiling points are above or below that of acrylonitrile. On the other hand acetonitrile extracted from the base of the second extractive distillation column contains all the above mentioned secondary impurities which are easily separated if desired by further distillations.

The present invention is described in more detail with reference to the accompanying drawing which is in the form of a flow diagram of the process. The mixture of nitriles to be separated, possibly having some water, is introduced through line 1 to the first extractive distillation column 2 below the absorption plates. The necessary heat is applied to the bottom of the column either in the form of steam by direct injection at 4 or by means of an intermediate boiler (not shown), or simultaneously by both methods. The column 2 is fed with water acting as solvent above its top plate, through line 3; this water may be fed at a temperature of about 70° C. but preferably at ambient or room temperature so as to create an internal reflux which allows reduction of the quantity of water necessary for the extractive distillation for a given number of absorption plates. The water/acrylonitrile azeotrope is drawn off through line 5 and then condensed and decanted in an apparatus represented by 6. The aqueous phase resulting from this decantation may be returned through line 7 to the entrance 3 of the column 2.

The organic phase consisting of acrylonitrile stripped of acetonitrile and saturated with water at ambient temperature is passed by way of line 8 to an apparatus 9 for azeotropic dehydration. From this apparatus practically pure acrylonitrile is withdrawn at 10 and at the head after condensation and decantation water saturated with acrylonitrile (approx. 7%) is returned through line 11 and entrance 3 to the top of the first extractive distillation column.

The aqueous phase which is taken from the base of the first extractive distillation column 2 containing all the acetonitrile is passed through line 12 to a concentration column 13 from where the mixture emerges through line 14, said mixture containing practically the total amount of acetonitrile and the acrylonitrile contained in the mixture introduced through line 12. At the base of column 13 water is drawn off and may be recycled to the extractive distillation, e.g. through 3. The fraction received at the top of the column 13 is very strongly enriched with acetonitrile in comparison with the mixture of nitriles introduced through 1.

This fraction is taken through line 14 to a second extractive distillation column 15 fed with water at its top plate through line 16. The nitrile fraction as in the first column is introduced below the absorption plates and at the top of the exhaustion plates. The heating of this column is accomplished in the same manner as in the first extractive distillation column. The temperature at the bottom is controlled in such a way that the aqueous solution extracted at the bottom through line 17 contains only acetonitrile to the practical exclusion of acrylonitrile.

The product extracted at the head after condensation contains all the acrylonitrile introduced through line 14 with part of the acetonitrile. The concentration of acetonitrile in the liquid can reach as much as 20Z. This solution is drawn off through line 18 and may be recycled to the inlet of column 2.

The aqueous solution of practically pure acetonitrile drawn off through line 17 may be fed to a concentration column 19 at the base of which water free of acetonitrile is recovered. This water may if desired be recycled to the second extractive distillation, for example through line 16.

The acetonitrile/water azeotrope obtained at 20 at the head of column 19 may be subjected to azeotropic dehydration in accordance with any known method.

The invention is illustrated further by reference to the following examples and the accompanying flow diagram.

*Example 1*

In the operation described in this example the column 2 contained 24 absorption plates and 12 exhaustion plates. A mixture of one part by weight of acrylonitrile containing 3.2% acetonitrile was fed continuously to the column which was supplied with 4.4 parts by weight of water at a temperature of 70° C. at its top plate, the temperature at the base of the column being maintained at 94 to 96° C. An overhead distillate was obtained which after condensation, decantation and reflux of an aqueous phase gave a product which contained less than 280 p.p.m. of acetonitrile in respect of acrylonitrile, i.e. less than 0.028% by weight.

The aqueous phase leaving the base of column 2 was subjected to concentration in column 13 resulting in a product containing 42% acetonitrile and 48% acrylonitrile. This product as has been indicated above had a considerably greater concentration of acetonitrile than the starting material. It was subsequently fed into a distillation column 15, comprising 20 absorption plates and 10 exhaustion plates, at a rate of one part of the product introduced for every 5.4 parts of water fed in at the top plate. The temperature at the bottom of this column was maintained at 92 to 94° C. At the base an aqueous solution of acetonitrile was obtained which after concentration gave an acetonitrile/water azeotrope containing less than 0.1% of acrylonitrile with respect to acetonitrile. The product recovered at the head of column 15 was a mixture of acrylonitrile, acetonitrile and water containing 7% acetonitrile with respect to acrylonitrile. It was recycled to the first extractive distillation column 2.

*Example 2*

The same column 2 was employed as in Example 1 and was charged with one part of nitriles containing 0.17% acetonitrile for every 4.4 parts of water introduced at its top plate. The temperature at the base was maintained at 98 to 99° C. An overhead product of acrylonitrile was obtained which contained less than 40 p.p.m. of acetonitrile. The liquid recovered from the top of column 13 contained 37% acetonitrile and 56% acrylonitrile. This product was fed to the extractive distillation column 15 at a rate of one part of nitrile for every 4.4 parts of water fed to the top plate of this column.

The product recovered from the top of column 15 was a solution containing 4.7% acrylonitrile. The product extracted from the base of the same column contained only 0.15% of acrylonitrile with respect to acetonitrile.

*Example 3*

The apparatus used was the same as in the preceding examples. An original mixture of nitriles contained 12.5% acetonitrile and was fed to column 2 at a rate of one part for every 7.1 parts of water introduced to the top plate of the column. One obtained on the one hand acrylonitrile containing less than 350 p.p.m. acetonitrile and on the other hand acetonitrile containing less than 0.5% acrylonitrile. The recycled product from column 15 to column 2 contained 8% of acetonitrile with respect to acrylonitrile.

*Example 4*

The first distillation column 2 had 30 absorption plates and 12 exhaustion plates. The second column 15 had 20 absorption plates and 7 exhaustion plates. Column 2 was fed with a mixture of nitriles, acrylonitrile containing 3.9% acetonitrile, at a rate of one part of acrylonitrile for 4.6 parts of water introduced at the top plate. One obtained on the one hand acrylonitrile containing less than 160 p.p.m. acetonitrile and on the other hand acetonitrile containing less than 0.1% of acrylonitrile. The recycled product from column 15 contained 1.6% acetonitrile with respect to acrylonitrile.

*Example 5*

In the apparatus of Example 4, column 2 was charged with a product containing 1% acetonitrile with respect to acrylonitrile at a rate of one part of product for every 4 parts of water introduced at the top plate. The acrylonitrile obtained contained less than 100 parts acetonitrile. The acetonitrile obtained contained 0.12% acrylonitrile. The product recycled from column 15 to column 2 contained 4% of acetonitrile with respect to acrylonitrile.

*Example 6*

The first distillation column 2 had 42 absorption plates and 10 exhaustion plates. The second column 15 was the same as that which had been used for Examples 4 and 5.

The acrylonitrile supplied to the separation contained 2.2% acetonitrile and was fed to column 2 at a rate of one part of nitriles for every 2.85 parts of water introduced at the top plate. One obtained on one hand pure acrylonitrile having 450 p.p.m. acetonitrile and on the other hand acetonitrile having 0.03% acrylonitrile and the recycled product containing 7% acetonitrile with respect to acrylonitrile.

*Example 7*

The same columns 2 and 15 were used as in Example 4. The mixture introduced into column 2 had the following composition:

| | Percent |
|---|---|
| Methanol | 0.02 |
| Acetonitrile | 3.8 |
| Propionitrile | 0.18 |
| Allyl alcohol | 0.06 |
| Acrylonitrile | 91.8 |
| Water | 4.1 |

This mixture was fed to column 2 at the rate of 0.93 part for every 4.6 parts of water fed to the top plate. The acrylonitrile extracted at the head of column 2 had the following composition:

| | Percent |
|---|---|
| Methanol | Less than 0.0005 |
| Acetonitrile | 0.024 |
| Propionitrile | Less than 0.001 |
| Allyl alcohol | Less than 0.001 | all with respect to acrylonitrile. The solution which collected at the base of column 2 contained practically all the organic impurities which accompanied the acrylontrile and 0.8% of acetonitrile. This solution was passed to column 13.

The mixture drawn off after condensation from the head of column 13 had a concentration of 58% acetonitrile. It was sent to the second extractive distillation column 15.

The solution extracted from the base of column 15 was concentrated in column 19 where acetonitrile containing no more acrylonitrile but the total of the secondary impurities, was withdrawn overhead after condensation.

The composition was as follows with respect of acetonitrile:

| | Percent |
|---|---|
| Methanol | 0.5 |
| Propionitrile | 4.3 |
| Allyl alcohol | 1.5 |
| Acrylonitrile | 0.11 |

*Example 8*

Column 2 contained 20 absorption plates and 10 exhaustion plates. A mixture of 1 part by weight of acrylonitrile containing 4% w./w. acetonitrile was fed to the column for every 10 ports of water fed to the top plate. The temperature in the base of the column was maintained at between 96° and 98° C. to give acrylonitrile as distillate containing not more than 180 p.p.m. of acetonitrile removed through line 5 and an aqueous base product containing about 0.3% w./w. acrylonitrile and 0.3% w./w. acetonitrile removed through line 12. This base product was fed to the concentration column 13 and distilled to give a 50/50 w./w. mixture of acrylonitrile and acetonitrile containing about 15% water.

The mixture recovered as distillate from concentration column 13 was passed through line 14 to the second extractive distillation column 15 also having 20 absorption plates and 10 exhaustion plates at a rate of 1 part of mixture for every 8.5 parts of water fed continuously to the top plate of the column. The temperature in the base of column 15 was maintained at 94° C. to give a distillate of acrylonitrile containing 1.7% acetonitrile. From the base of column 15 through line 17 acetonitrile containing less than 1% w./w. acrylonitrile was recovered as an aqueous solution. The acrylonitrile distillate was recovered through line 18 and may be recycled to column 2 for further purification.

I claim:
1. A continuous process for the separation of acrylonitrile and acetonitrile from their admixture comprising less than 20% weight by weight of acetonitrile, which comprises subjecting the mixture to a first extractive distillation, employing water as the extractant, to obtain substantially pure acrylonitrile as an overhead fraction and an aqueous solution containing acetonitrile as a first base product, distilling the base product to obtain an overhead fraction containing substantially all the acetonitrile and subjecting all of this overhead fraction without separation into components to a second extractive distillation with water to obtain an aqueous solution of acetonitrile substantially free from acrylonitrile as a second base product.

2. A process as claimed in claim 1 wherein the original mixture of acrylonitrile and acetonitrile contains less than 10% weight by weight of acetonitrile.

3. A process as claimed in claim 1 wherein the operating conditions of the first extractive distillation are so selected as to yield a first base product containing a weight ratio of acrylonitrile to acetonitrile between about 4:1 and 1:4.

4. A process as claimed in claim 3 wherein the operating conditions of the first extractive distillation are so selected as to yield a first base product containing a weight ratio of acrylonitrile to acetonitrile of about 1:1.

5. A process as claimed in claim 1 wherein the first base product from the first extractive distillation is distilled to obtain an overhead fraction containing substantially all the acetonitrile and an aqueous third base product, recycling said aqueous third base product to at least one of the extractive distillations as part of the aqueous feed thereto.

6. A process as claimed in claim 1 wherein the overhead product from the second extractive distillation is recycled as part of the aqueous feed to the first extractive distillation.

7. A process as claimed in claim 1 wherein the second base product from the second extractive distillation is concentrated by removal of water therefrom, said removed water then being recycled as part of the water feed to at least one of said extractive distillations.

8. A process as claimed in claim 7 wherein the overhead fraction from the first extractive distillation and the concentrated second base product from the second extractive distillation are dried by azeotropic dehydration.

References Cited

UNITED STATES PATENTS

| 2,415,662 | 2/1947 | Teter et al. | 203—97 |
| 2,461,048 | 2/1949 | Frejacques | 203—33 X |
| 2,681,306 | 6/1954 | Kemp et al. | 203—97 X |
| 2,807,573 | 9/1957 | Robertson | 203—33 |
| 2,878,166 | 4/1959 | Dunn | 203—46 |
| 3,210,399 | 10/1965 | Krzemicki | 260—465.3 |
| 3,264,197 | 8/1966 | Schonbeck et al. | 203—84 |

FOREIGN PATENTS

| 914,167 | 10/1946 | France. |
| 719,911 | 12/1954 | Great Britain. |

NORMAN YUDKOFF, *Primary Examiner.*

F. E. DRUMMOND, *Assistant Examiner.*